June 4, 1935.  C. L. THOMSEN  2,003,318
POULTRY FEEDING AND WATERING DEVICE
Filed Feb. 2, 1934  2 Sheets-Sheet 1
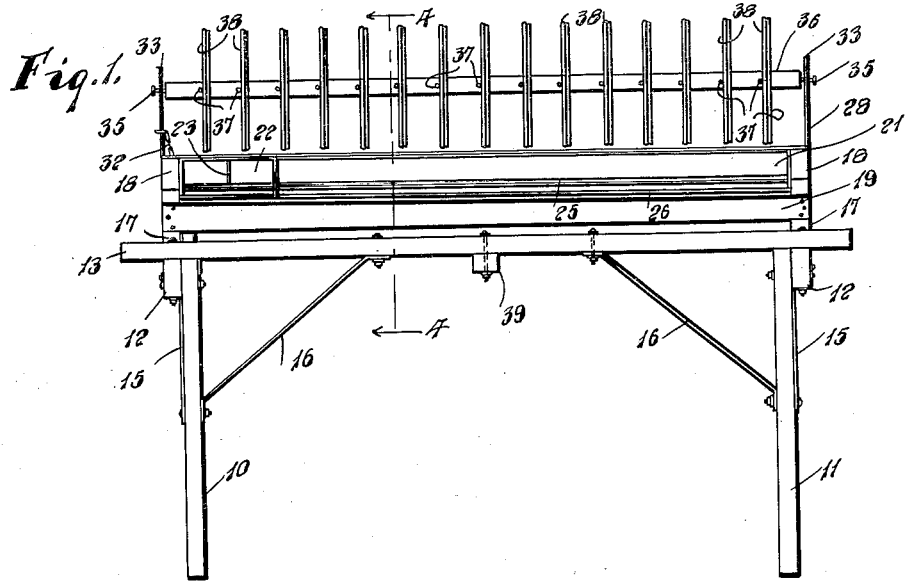
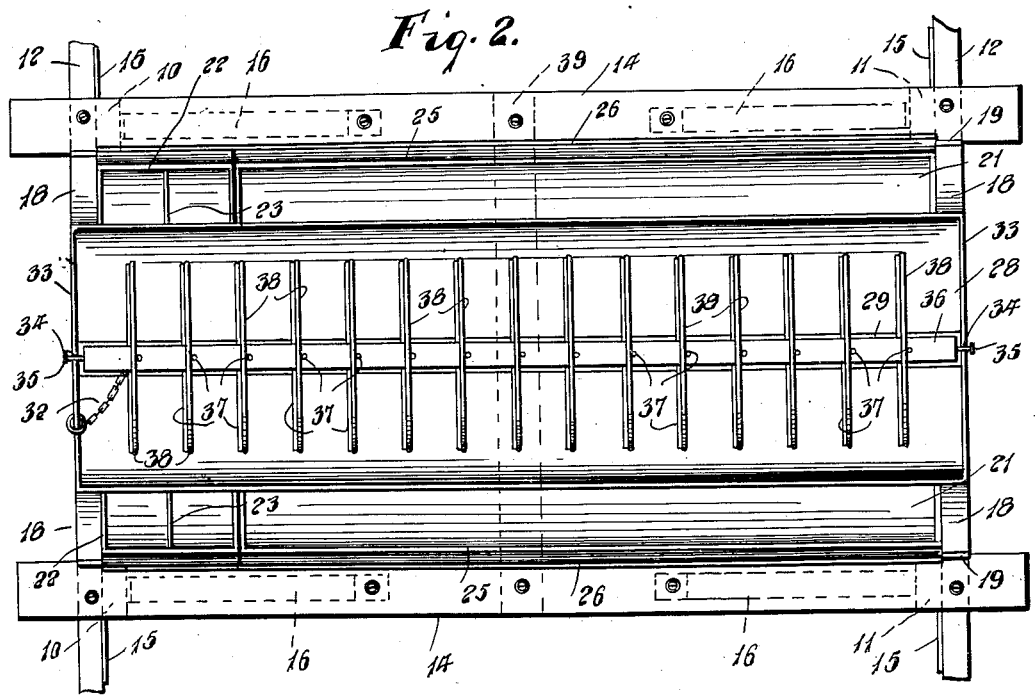
Inventor
C. L. Thomsen
By L. F. Rudolph Jr.
Attorney June 4, 1935. C. L. THOMSEN 2,003,318
POULTRY FEEDING AND WATERING DEVICE
Filed Feb. 2, 1934   2 Sheets-Sheet 2
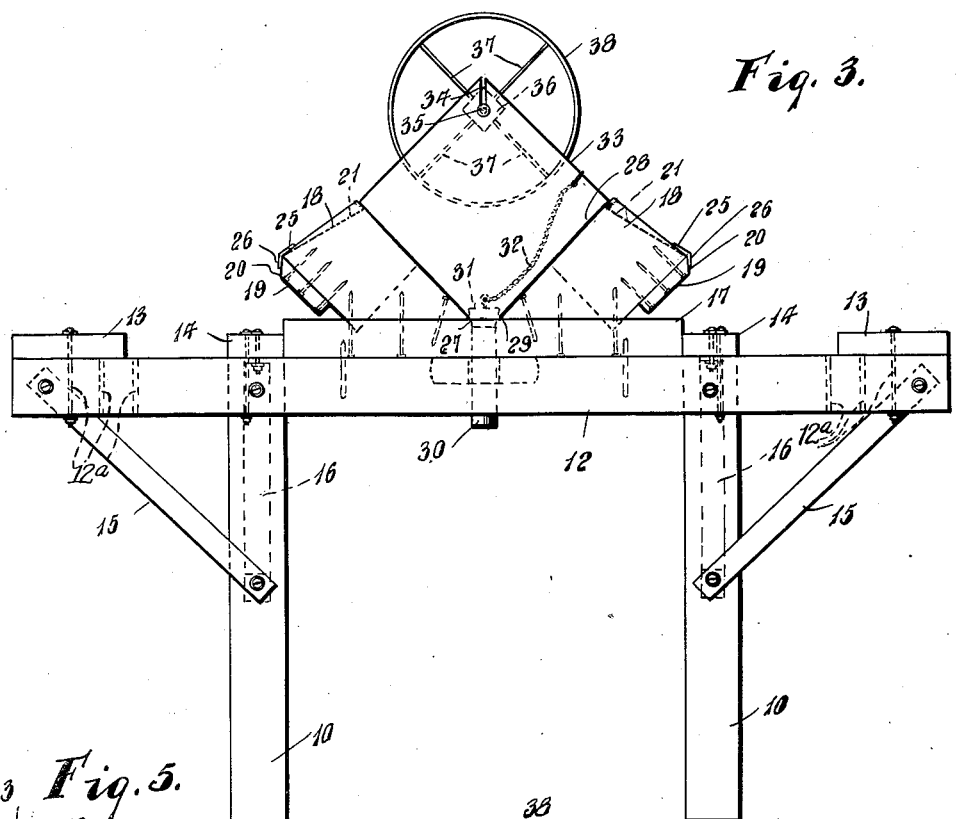
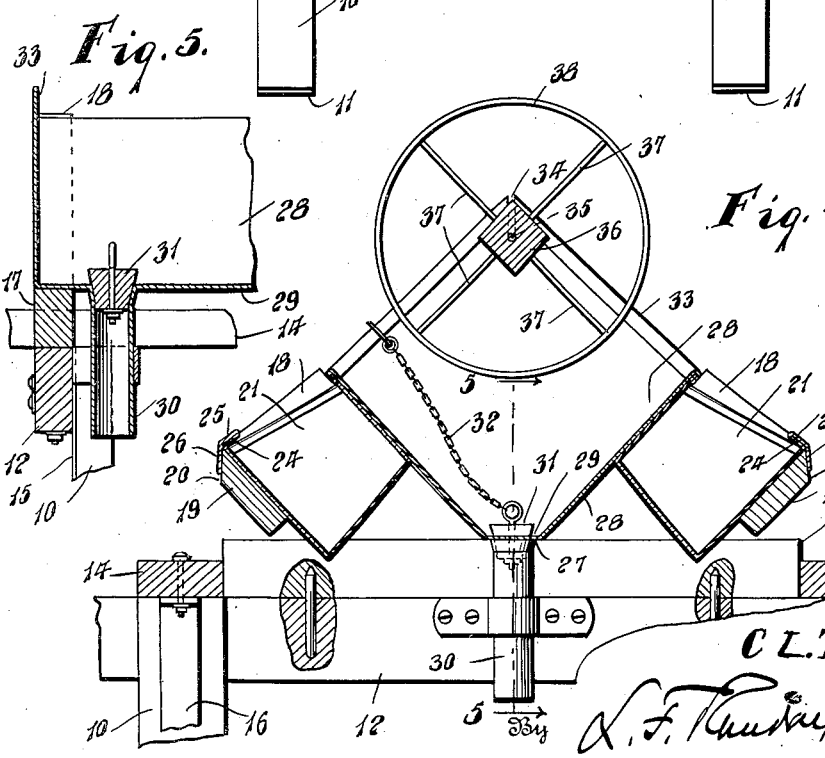

Patented June 4, 1935

2,003,318

UNITED STATES PATENT OFFICE 2,003,318

POULTRY FEEDING AND WATERING DEVICE

Carl L. Thomsen, Milwaukee, Wis.

Application February 2, 1934, Serial No. 709,513

5 Claims. (Cl. 119—61)

The invention relates to devices for feeding and watering poultry and has for its object, primarily, the provision of a device providing means whereby the feeding and watering of poultry is carried on on a single apparatus so as to prevent the necessity of the fowls moving from one part of a yard or pen to another to obtain food and water, this being objectionable because of interference with individual fowls by other individuals, and particularly relating to interference by cockerels with hens during the mating season.

A further object of the invention is the provision of means including troughs for holding granulated oyster shell or the like, and also grit or gravel conveniently located in connection with the feeding and watering device so that these materials may be readily accessible to the fowls and encouraging the fowls to use this material in larger quantities than would ordinarily be the case where it is necessary that the material be searched for and scratched up.

A further object of the invention is the provision of a feeding and watering device for poultry that is readily dismembered and parts replaced so that the different portions of the apparatus may be kept in a sanitary condition at all times.

A further object of the invention is the provision in combination with a trough of means whereby the individual fowls may use the trough with little or no interference by other individual fowls, and whereby the fowls are also prevented from roosting on the edges of the trough, this being accomplished by provision of a rotatable shaft mounted on the trough and having a plurality of rings secured thereto and spaced apart a sufficient distance to admit of the fowl entering its head and neck between adjacent rings, the spaced rings being located so as to prevent fowls from landing and roosting on the edge of the trough.

The invention will be described in detail hereinafter and will be found illustrated in the accompanying drawings in which Figure 1 is a side view in elevation of a watering and feeding device made in accordance with the invention, Figure 2 is a top plan view on an enlarged scale and shown fragmentarily, Figure 3 is an end view, Figure 4 is a fragmentary sectional view on a plane indicated by the line 4—4 of Figure 1, parts of the view being also broken away and shown in section, and Figure 5 is a sectional detail on a plane indicated by the line 5—5 of Figure 4.

In the drawings similar reference characters are used to designate corresponding parts in all the views.

The improved feeding and watering device is elevated above the ground by means of legs 10 and 11, the legs 10 being shorter slightly than the legs 11 so as to provide means for draining the water trough, to be hereinafter described, in one end thereof to readily discharge the water contained therein to a drain pipe, so that with little effort the water trough may be kept clean and fresh water replace the stale water that may be contained therein at frequent intervals.

Secured to the legs 10 and 11 at opposite ends of the structure are cross bars 12 to which are secured longitudinal perches or roost bars 13 and 14. Cross bars 12 are provided with series of openings 12ª so that roost bars 13 may be adjustably secured on said cross bars as may be found necessary for proper feeding and watering the poultry. 15 are brace members connecting the legs 10 and 11 with the end portions of the cross bars 12, and 16 are other brace members connecting the legs 10 and 11 with the roost bars 14.

Mounted on the end bars 12 are end pieces 17, and secured to said end pieces 17 are outwardly and upwardly, and oppositely inclined arms 18. Connecting the corresponding arms with the opposite ends of the frame are longitudinal bars 19 that have their upper edges beveled downwardly and outwardly from the arms 18 as shown at 20. Bars 19 are provided to support long troughs 21 and shorter troughs 22, the shorter troughs being each provided with a transverse partition 23 dividing each trough into two receptacles, one of said receptacles being to contain ground oyster shell, and the other to contain fine gravel, the longer troughs 21 being to contain feed which is preferably dry mash. Troughs 20 and 21 are preferably made of sheet metal and each trough has one of its edges extended beyond the other edges of the trough, the metal of said extended portion being bent inwardly of the trough as shown at 24, and then returned outwardly of the trough as shown at 25, and the extended edge of the outwardly returned portion bent downwardly and outwardly at an angle as shown at 26 to provide an overhang to engage the beveled portion 20 of one of the bars 19 and hold said trough in position as shown in the drawings.

The inturned portions 24, completed by the returned portions 25, form inwardly extended lips on the troughs so as to catch droppings from the bill of the fowl when feeding to prevent waste, and also to prevent the fowl from throwing the food out of the trough by movement of its bill when feeding.

By this arrangement of the arms 18 and the troughs 21 and 22, it will be apparent that there is arranged a space therebetween of substantially angular shape, except that the inner portions of the arms 18 where secured to the end members 17 are spaced slightly and provide a horizontal portion as best shown at 27 at each end of the device. Mounted in this angular space, and supported by troughs 21 and 22, is a substantially V-shaped trough 28 having its bottom 29 flat or horizontal, thus providing a truncated V-shape. As shown in the drawings the trough 28 is arranged for a water trough and is provided with a drain pipe 30 secured at one end of the trough, the end which is supported by the legs 10, the shorter legs, said drain pipe communicating with the trough by means of a drain opening, and 31 is a removable plug closing said drain opening and secured to the end of the trough by means of a chain or other flexible member 32. By this construction it will be apparent that when it is desired to replace the water in the trough with fresh water the trough may be readily drained by removing the plug 31 and also that water and cleansing material used for cleaning the trough may also be readily discharged through the drain. The ends of trough 28 have upwardly extending portions 33 which may be as shown in the drawings triangular in shape, and completing a substantial rectangle at each end of the trough, or obviously any other upwardly extending portion may be substituted, and each of said end portions 33 is provided with an open slot 34 to receive a pin 35 on the opposite ends of a shaft 36. The shaft 36 in the drawings is shown to be a rectangle in cross section, but obviously the shaft may be circular or any other shape desired. Secured transversely of the shaft 36 are rods 37, and secured to the terminals of said rods are rings 38. The rods 37 and rings 38 are spaced along the shaft as shown in the drawings at proper intervals so that they provide means whereby the individual fowls in drinking the water will have their heads and necks separated from adjacent fowls to prevent interference of one individual fowl with another while drinking. Furthermore, it will be understood that, as it is necessary for fowls when drinking to raise their heads in order to be able to swallow, the water clinging to the head feathers and wattles and beak of the fowl will drop into the dry mash and be absorbed thereby, the absorption of the water by the dry mash causing the mash to rise slightly where the water strikes it because of the expansion of the material in the absorption of the water, so that these parts will be first partaken of by the fowls when feeding, and to a large extent prevent the mash from becoming saturated with water to its detriment by souring.

Furthermore, the rotatable shaft 36, with the rings spaced along the shaft, as above stated, provides a baffle to prevent the fowls from perching or alighting on the side edges of the trough 28 thus preventing the water and the feed and other material in the side troughs from being fouled by droppings from the fowls.

Intermediate of the cross bars 12 is a supplemental cross bar 39 that serves to brace the perches 14, and may also be used to support members corresponding to the end members 17 and 18 when desired. This is particularly desirable where the device is to be used for a large flock of poultry, the example of the device shown in the drawings being designed for a small flock. Where there are more fowls in the flock it will be obvious that the feeding and watering device may be elongated and to adequately support the troughs other supporting members should be supplied. Furthermore, in providing for larger flocks, a plurality of feed troughs 21 and grit troughs 22 may be provided so that the fowls may be adequately fed and supplied with granular material.

What I claim as my invention is:—

1. In a poultry feeding and watering device, an elevated supporting frame including spaced substantially parallel bars, troughs, means to support said troughs on said bars, and another trough supported by and between said first mentioned troughs.

2. In a poultry feeding and watering device, an elevated supporting frame having outwardly and upwardly inclined arms, bars secured to said arms, troughs supported on said bars, and another trough supported on said frame and engaging said inclined arms and the first mentioned troughs.

3. In a poultry feeding and watering device, a trough, a shaft journaled on said trough, transversely extending arms on said shaft at spaced intervals, and rings secured to the terminals of said arms, the spaced rings providing means to separate poultry using the trough and to prevent the poultry from roosting on the trough.

4. In a poultry feeding and watering device, an elevated supporting frame, cross bars on said frame, arms secured on said cross bars and inclined from one another, side bars secured to the undersides of said arms, troughs having overhanging lips, the troughs being mounted on said side bars and the overhanging lips engaging the side bars, and a V-shaped trough supported on said cross bars and inclined arms and on the first mentioned troughs.

5. In a poultry feeding and watering device, an elevated supporting frame having cross bars and longitudinal perch bars secured thereto, outwardly and upwardly inclined arms mounted on said cross bars, bars secured to said arms, troughs mounted on the last mentioned bars and having overhanging lips engaging the upper edges of said bars, said troughs being adapted to contain feed and granulated material for use of poultry, a V-shaped watering trough mounted on said cross bars, arms and the first mentioned troughs, a shaft journaled on said watering trough, and rings supported on said shaft and arranged at spaced distances.

CARL L. THOMSEN.